(12) United States Patent
Lin et al.

(10) Patent No.: US 10,488,920 B2
(45) Date of Patent: Nov. 26, 2019

(54) IMMERSIVE HEADSET SYSTEM AND CONTROL METHOD THEREOF

(71) Applicant: HTC Corporation, Taoyuan (TW)

(72) Inventors: Sheng-Cherng Lin, Taoyuan (TW); Chang-Hua Wei, Taoyuan (TW)

(73) Assignee: HTC Corporation, Taoyuan (TW)

( * ) Notice: Subject to any disclaimer, the term of this patent is extended or adjusted under 35 U.S.C. 154(b) by 7 days.

(21) Appl. No.: 15/613,117

(22) Filed: Jun. 2, 2017

(65) Prior Publication Data

US 2018/0348860 A1    Dec. 6, 2018

(51) Int. Cl.
*G06F 3/01* (2006.01)
*G06K 9/00* (2006.01)

(52) U.S. Cl.
CPC .......... *G06F 3/013* (2013.01); *G06K 9/0061* (2013.01); *G06K 9/00671* (2013.01)

(58) Field of Classification Search
CPC ... G06F 3/013; G06K 9/00671; G06K 9/0061
See application file for complete search history.

(56) References Cited

U.S. PATENT DOCUMENTS

| | | | |
|---|---|---|---|
| 9,250,445 B2 | 2/2016 | Tosaya et al. | |
| 2010/0079356 A1* | 4/2010 | Hoellwarth | G02B 27/017 345/8 |
| 2011/0194029 A1* | 8/2011 | Herrmann | G02B 27/017 348/569 |
| 2016/0065952 A1* | 3/2016 | Han | G06K 9/00604 345/8 |
| 2016/0116745 A1* | 4/2016 | Osterhout | G06F 3/03547 359/614 |
| 2016/0132189 A1* | 5/2016 | Choi | G06T 19/006 345/633 |
| 2016/0195772 A1* | 7/2016 | Lee | G02F 1/133611 349/61 |
| 2016/0364904 A1* | 12/2016 | Parker | G06F 3/012 |
| 2017/0038592 A1* | 2/2017 | Sudo | G02B 27/0176 |
| 2017/0344107 A1* | 11/2017 | Aghara | G02B 27/0172 |

(Continued)

FOREIGN PATENT DOCUMENTS

| | | |
|---|---|---|
| CN | 205015835 U | 2/2016 |
| EP | 2993577 A1 | 3/2016 |
| TW | 201437688 A | 10/2014 |

OTHER PUBLICATIONS

Corresponding Taiwan office action dated Dec. 5, 2018.

*Primary Examiner* — Jose R Soto Lopez
(74) *Attorney, Agent, or Firm* — CKC & Partners Co., LLC

(57) ABSTRACT

An immersive headset system includes a headset device and a displaying device. The headset device includes a pupillary sensor for determining an interpupillary distance value. The displaying device is communicated with the headset device. The displaying device includes a display panel for displaying an immersive content. The immersive content includes a right visual window and a left visual window. The right visual window and the left visual window are displayed synchronously at different positions on the display panel. When the displaying device receives the interpupillary distance value from the headset device, the right visual window and the left visual window of the immersive content are allocated by the displaying device according to the interpupillary distance value.

17 Claims, 14 Drawing Sheets

(56) References Cited

U.S. PATENT DOCUMENTS

| | | | |
|---|---|---|---|
| 2018/0047202 A1* | 2/2018 | Long | G06T 11/00 |
| 2018/0096503 A1* | 4/2018 | Kaehler | G02B 27/0172 |
| 2018/0152698 A1* | 5/2018 | Hwang | A61B 3/0025 |
| 2019/0028690 A1* | 1/2019 | Raghoebardajal | G06T 7/593 |

* cited by examiner

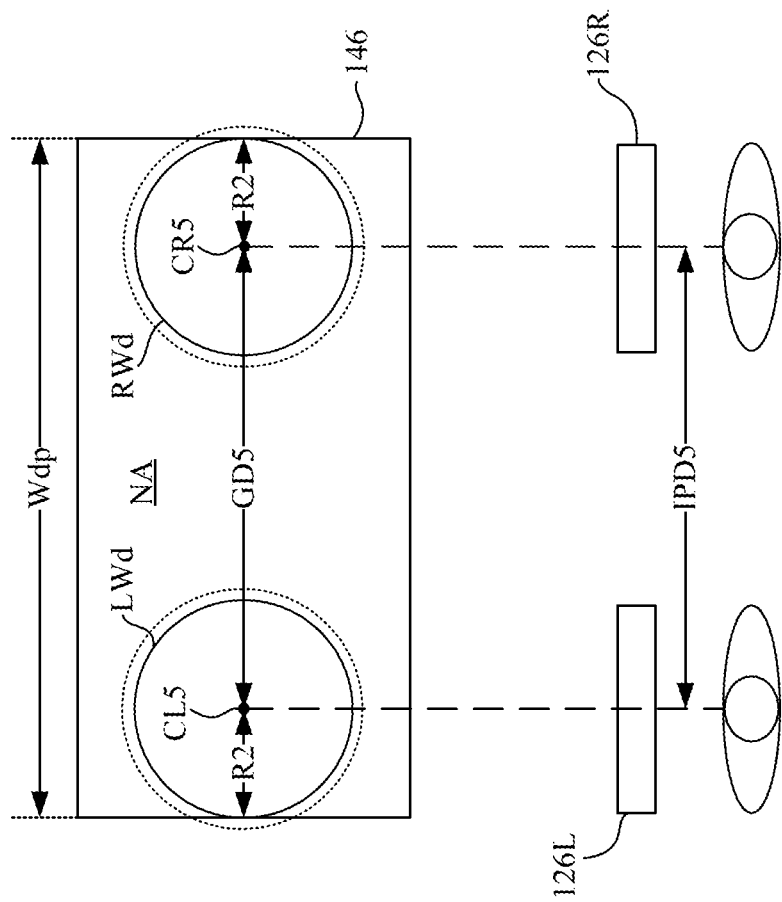

IMMERSIVE HEADSET SYSTEM AND CONTROL METHOD THEREOF

BACKGROUND

Technical Field

The present invention relates to an immersive headset system. More particularly, the present invention relates to a method for controlling right and left visual windows provided by the immersive headset system.

Description of Related Art

Virtual reality (VR), Augmented Reality (AR), Substitutional Reality (SR), and/or Mixed Reality (MR) devices are developed to provide immersive experiences to users. When a user wearing a head-mount display device, the visions of the user will be covered by the immersive content shown on the head-mount display device. The immersive content shows a scenario of a specific space.

There are different approaches to implement an immersive headset system. One of these approaches is to combine a head-mounted holder and a mobile phone. The head-mounted holder is wearable by the user. The mobile phone can be accommodated in a slot in the head-mounted holder. The immersive content can be shown as a split screen on the display panel on the mobile phone. For example, Google Cardboard is a way to provide the head-mounted holder. The mobile phone utilized in this case may have different sizes of display panels (e.g., from 4.5 inches to 6.5 inches). Sometimes, the user is required to adapt his/her eyes to the panel size, so as to see the immersive contents clearly.

SUMMARY

An embodiment of the disclosure provides an immersive headset system, which includes a headset device and a displaying device. The headset device includes a pupillary sensor for determining an interpupillary distance value. The displaying device is communicated with the headset device. The displaying device includes a display panel for displaying an immersive content. The immersive content includes a right visual window and a left visual window. The right visual window and the left visual window are displayed synchronously at different positions on the display panel. When the displaying device receives the interpupillary distance value from the headset device, the right visual window and the left visual window of the immersive content are allocated by the displaying device according to the interpupillary distance value.

An embodiment of the disclosure provides a control method, which can be utilized by an immersive headset system. The immersive headset system includes a displaying device for displaying an immersive content. The control method include following steps. An interpupillary distance value is determined. The interpupillary distance value is transmitted to the displaying device. A right visual window and a left visual window of the immersive content are allocated according to the interpupillary distance value.

Based on embodiments of the disclosure, the displaying device is able to allocate the right visual window and the left visual window according to the interpupillary distance value detected by the headset device. When the interpupillary distance value is changed, a distribution of the immersive content on the display panel can be reallocated to be suitable for visions of the user.

BRIEF DESCRIPTION OF THE DRAWINGS

The disclosure can be more fully understood by reading the following detailed description of the embodiment, with reference made to the accompanying drawings as follows.

FIG. 8A is a schematic diagram illustrating an embodiment of the adjusted left visual window and the adjusted right visual window in relative to the embodiment shown in FIG. 7.

DETAILED DESCRIPTION

Figure 1A:
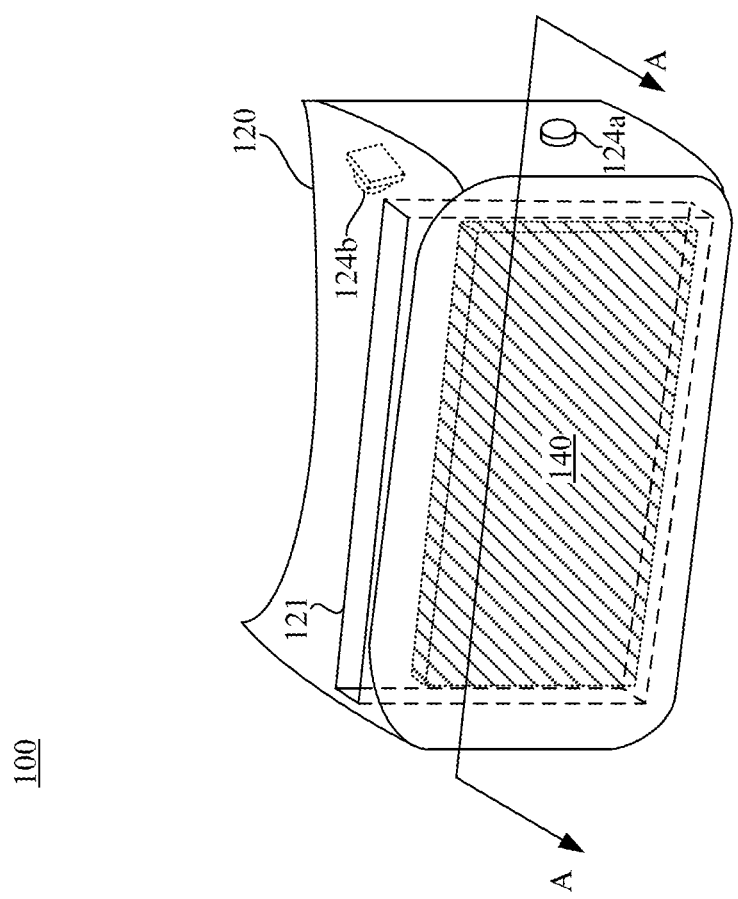
FIG. 1A is a perspective diagram illustrating an immersive system 100 according to an embodiment of the disclosure.

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1A is a perspective diagram illustrating an immersive system 100 according to an embodiment of the disclosure. The immersive system 100 includes a headset device 120 and a displaying device 140. As shown in FIG. 1A, the headset device 120 includes a housing 121. The displaying device 140 can be accommodated at a fixed position within the housing 121.

Figure 1B:
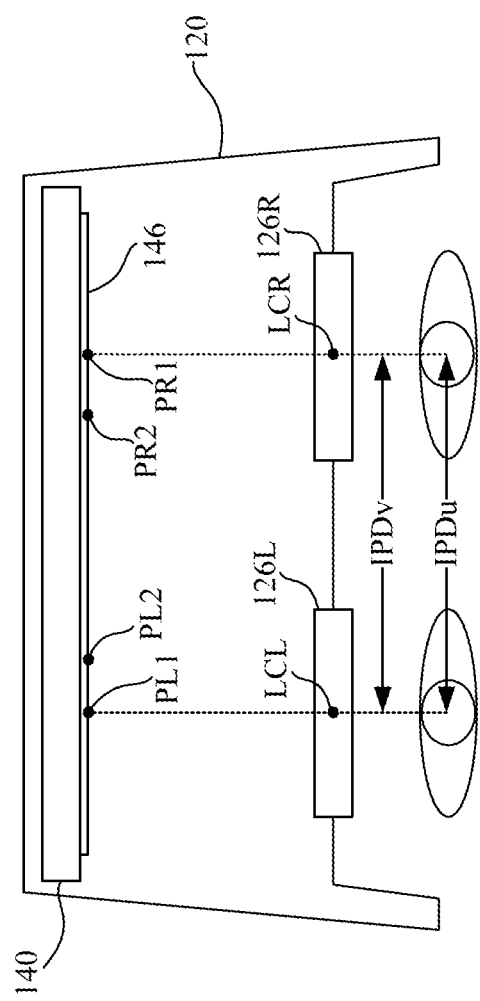
FIG. 1B is sectional view illustrating the immersive system along a sectional line A-A in FIG. 1A.
Figure 2:
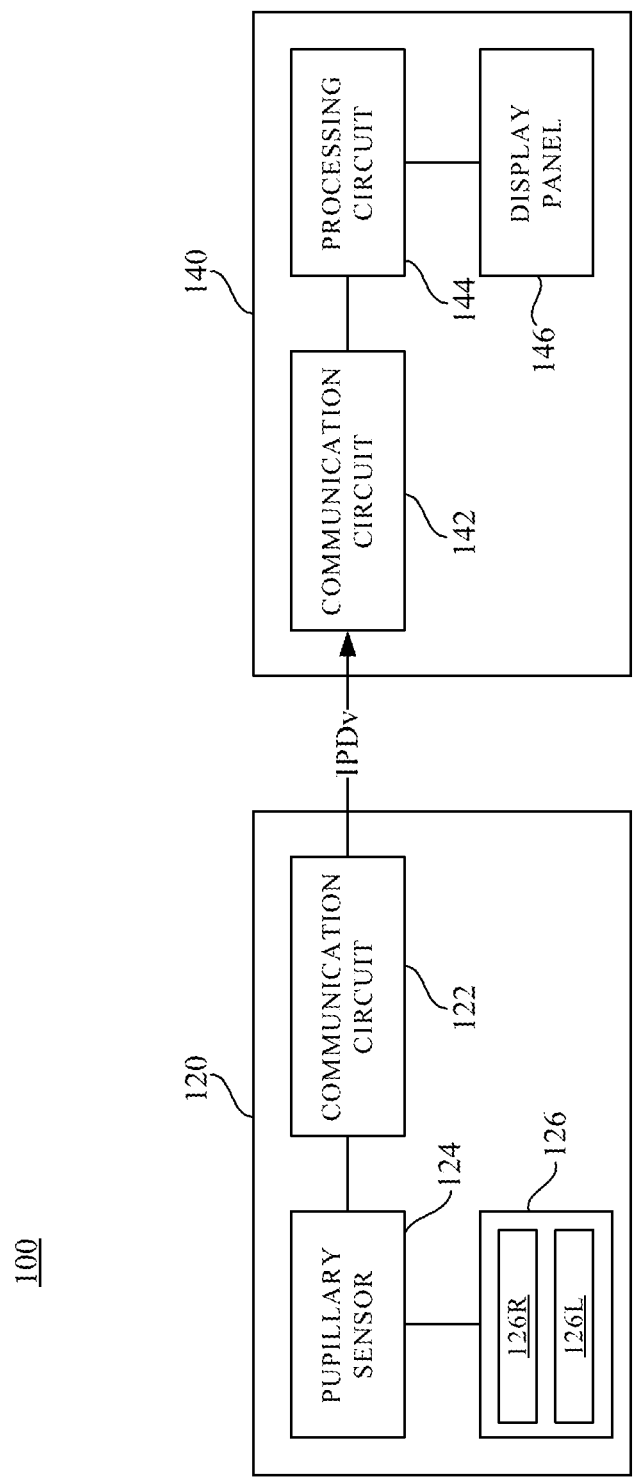
FIG. 2 is a functional block diagram illustrating the immersive system in FIG. 1A.

In an embodiment, the headset device 120 can be a head mount which is wearable on a head of a user or suitable to be placed in front of eyes of the user. In an embodiment, the displaying device 140 can be a smart phone, a mobile phone, a portable displayer or any equivalent electronic apparatus. Reference is also made to FIG. 1B and FIG. 2. FIG. 1B is sectional view illustrating the immersive system 100 along a sectional line A-A in FIG. 1A. FIG. 2 is a functional block diagram illustrating the immersive system 100 in FIG. 1A.

As shown in FIG. 2, the displaying device 140 includes a display panel 146. When the displaying device 140 is accommodated within the headset device 120, the headset device 120 is configured to locate a position the display panel 146 in front of eyes of the user (e.g., the observer wearing the immersive system 100), such that the user can see immersive contents (e.g., an image, a three-dimension video, a virtual reality scene, an augmented reality, etc.) displayed on the display panel 146. The whole field of the user will be covered by the display panel 146, such that so the user can enjoy an immersive experience provided by the immersive system 100.

In an embodiment, the headset device 120 and the displaying device 140 in the immersive system 100 can be manufactured separately or individually. For example, the headset device 120 and the displaying device 140 can be manufactured by different providers, or different models from the same providers. In an embodiment, the headset device 120 is configured to be compatible with different models of displaying devices 140, and these displaying devices 140 may have various sizes of the display panel 146. In this case, the housing 121 may include an adjustable holder (not shown in figures) to fasten the position of different displaying devices 140.

As shown in FIG. 1B, the headset device 120 is configured to be located in front of eye visions of the user. Every individual person may have his/her own features of his/her eyes. For example, different persons may have different interpupillary distances (IPD). The interpupillary distance is a gap distance between the centers of the pupils of the two eyes. As shown in FIG. 1B, the centers of the pupils of the two eyes are gapped with a specific interpupillary distance IPDu. The interpupillary distance IPDu is critical for the design of binocular viewing systems. The interpupillary distance IPDu may be different for different users. Each person will have his/her own interpupillary distance IPDu.

As shown in FIG. 1B, there are a left projection point PL1 in front of the center of the left pupil and a right projection point PR1 in front of the center of the right pupil. When a left visual window of the immersive content is displayed on the display panel 146 around the left projection point PL1 and a right visual window of the immersive content is displayed on the display panel 146 around the right projection point PR1, the eye visions are aligned to the immersive contents. Two eyes of the user can be relaxed and look forward to the front. The left visual window and the right visual window are configured to display parallax vision images with different viewpoints, which are designed corresponding to two individual eyes of user. The left visual window will be observed by the left eye of the user and the right visual window will be observed by the right eye of the user, such that the user will see a stereoscopic scene with both eyes in combination.

On the other hand, if the left visual window of the immersive content is displayed around another point PL2 and the right visual window of the immersive content is displayed around another point PR2 as shown in FIG. 1B, the user is required to stress his/her eye while observing the immersive content displayed on the display panel 146. There is a misalignment between two eyes of the user and the immersive content because the immersive content is not displayed corresponding to the interpupillary distance. In this case, aforesaid misalignment may cause a cross-eye experience to the user, and the eyes of the user may get tired easily for being stressed inward to see the immersive content.

As an embodiment shown in FIG. 2, the headset device 120 includes a communication circuit 122, a pupillary sensor 124 and a lens module 126. The pupillary sensor 124 is coupled with the communication circuit 122 and the lens module 126. The pupillary sensor 124 of the headset device 120 is configured to determine an interpupillary distance value IPDv (referring to FIG. 2) corresponding to the interpupillary distance IPDu between two pupils of the user (referring to FIG. 1B).

In an embodiment, the interpupillary distance value IPDv determined by the pupillary sensor 124 is preferably to be equal to the interpupillary distance IPDu between two pupils of the user as shown in FIG. 1B.

In an embodiment, the interpupillary distance value IPDv determined by the pupillary sensor 124 is utilized by the headset device 120 to configured some parameters on the headset device 120. For example, the lens module 126 is adjusted according to the interpupillary distance value IPDv.

In an embodiment, the lens module 126 of the headset device 120 includes a left lens unit 126L and a right lens unit 126R referring to FIG. 1B. Locations of the left lens unit 126L and the right lens unit 126R are moved correspondingly to the interpupillary distance value IPDv determined by the pupillary sensor 124. As shown in FIG. 1B, a center LCL of the left lens unit 126L and a center LCR of the right lens unit 126R are gapped with a distance corresponding to the interpupillary distance value IPDv. In an embodiment, the lens module 126 further includes a mechanical actuator (e.g., a gear set and/or a micro motor), which is configured to move the left lens unit 126L and the right lens unit 126R inward to each other when the interpupillary distance value IPDv is shorter, and move the left lens unit 126L and the right lens unit 126R outward far from each other when the interpupillary distance value IPDv is longer. Therefore, the left lens unit 126L and the right lens unit 126R of the lens module 126 are located in front of two pupils of both eyes correspondingly to the interpupillary distance value IPDv.

If the headset device 120 is mounted on another user with a different interpupillary distance IPDu (e.g., the previous user has a interpupillary distance of 65 mm and the headset device 120 is now mounted on another user with another interpupillary distance of 68.5 mm), the pupillary sensor 124 is configured to determine the new interpupillary distance value IPDv (e.g., the pupillary sensor 124 will update the interpupillary distance value IPDv from 65 mm to 68.5 mm).

In an embodiment, the pupillary sensor 124 includes an adjustment controller 124a (referring to FIG. 1A) disposed on the headset device 120. The adjustment controller 124a can be operated manually by the user. The interpupillary distance value IPDv is adjusted corresponding to a manipulation input on the adjustment knob 124a. For example, the adjustment controller 124a shown in FIG. 1A is an adjustment rotatable knob, the interpupillary distance value IPDv will be increased when the adjustment controller 124a is rotated clockwise, and the interpupillary distance value IPDv will be decreased when the adjustment controller 124a is rotated counter-clockwise. The disclosure is not limited thereto. The interpupillary distance value IPDv can be adjusted by the adjustment controller 124a in other equivalent manipulation manners with different adjustment controllers (e.g., by switch buttons, by an adjustment bar, via input keypads, etc.).

In another embodiment, the pupillary sensor 124 includes an eye-tracking camera 124b (referring to FIG. 1A) disposed on the headset device 120. The eye-tracking camera 124b is configured to measure the interpupillary distance value IPDv. For example, the eye-tracking camera 124b can capture images of the eyes. The locations of the pupils are detected by the eye-tracking camera 124b, and the interpupillary distance value IPDv is measured accordingly by the eye-tracking camera 124b.

Based on aforesaid embodiments, the interpupillary distance value IPDv can be determined by the pupillary sensor 124 of the headset device 120. In an embodiment, the interpupillary distance value IPDv is utilized by the headset device 120 to move the left lens unit 126L and the right lens unit 126R correspondingly, and the interpupillary distance value IPDv is also transmitted from the headset device 120 to the displaying device 140. The interpupillary distance value IPDv is also utilized by the displaying device 140 to allocate the left visual window and the right visual window of the immersive content.

In an embodiment, the communication circuit 122 can be a wireless communication circuit (e.g., a Bluetooth transceiver, a BLE transceiver, a WiFi-direct transceiver, a Zigbee transceiver, an infrared transceiver and/or other wireless transceiver circuits) or a cable transmission interface (a USB transmission interface and/or other wired cable interfaces). The communication circuit 122 of the headset device 120 is configured to send the interpupillary distance value IPDv determined by the pupillary sensor 124 to the displaying device 140.

As an embodiment shown in FIG. 2, the displaying device 140 includes a communication circuit 142, a processing circuit 144 and the display panel 146. The communication circuit 142 of the displaying device 140 can be a wireless communication circuit (e.g., a Bluetooth transceiver, a BLE transceiver, a WiFi-direct transceiver, a Zigbee transceiver, an infrared transceiver and/or other wireless transceiver circuits) or a cable transmission interface (a USB transmission interface and/or other wired cable interfaces) corresponding to the communication circuit 122 of the headset device 120. In an embodiment, the communication circuit 142 is configured to receive the interpupillary distance value IPDv from the headset device 120. The processing circuit 144 is coupled with the communication circuit 142 and the display panel 146. The processing circuit 144 is configured to process the immersive content to be displayed on the display panel 146. In an embodiment, the processing circuit 144 will process the immersive content according to the interpupillary distance value IPDv, such that the immersive content will be optimized for the user current utilizing the immersive system 100. In an embodiment, the processing circuit 144 can include a graphic processing unit (GPU), a central processing unit (CPU), a processor, a system on chip (SoC) circuit and/or any equivalent processing circuits. Details about how to process the immersive content will be explained in following paragraphs.

Figure 3:
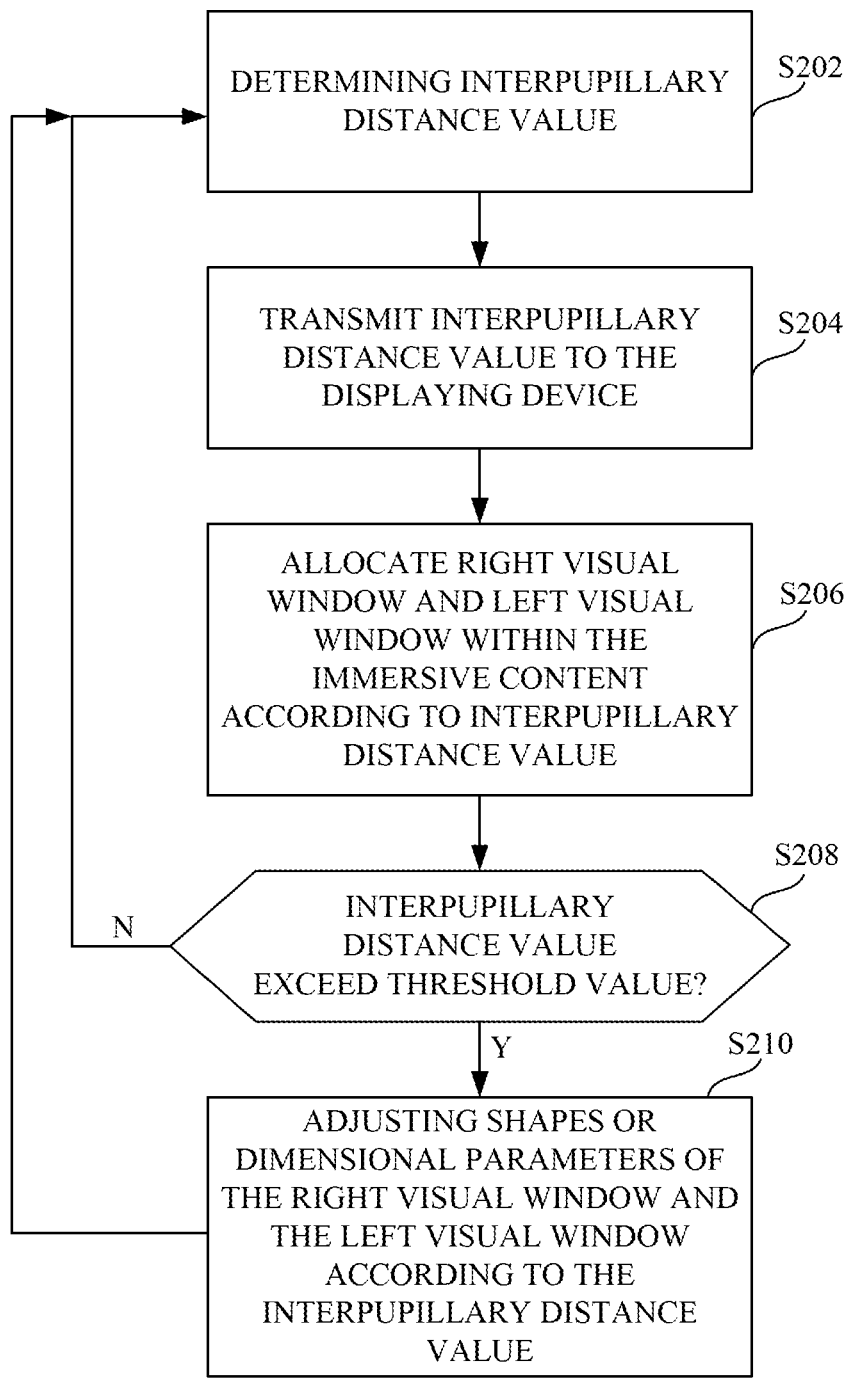
FIG. 3 is a flow chart diagram illustrating a control method according to an embodiment of the disclosure.
Figure 4:
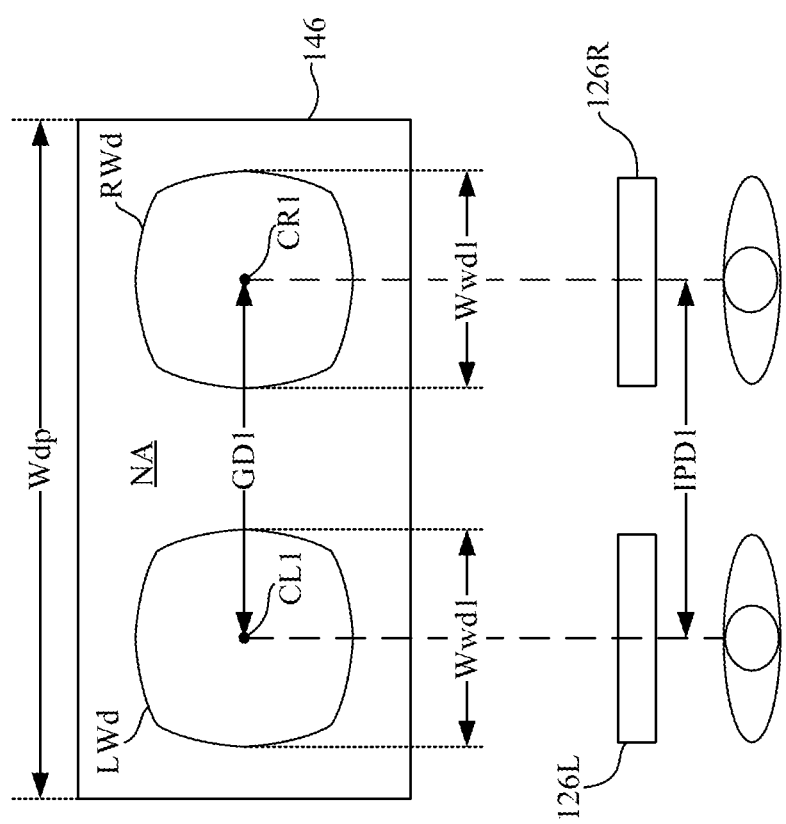
FIG. 4 is a schematic diagram illustrating an embodiment of the immersive content shown on the display panel in FIG. 1B and FIG. 2.

Reference is further made to FIG. 3 and FIG. 4. FIG. 3 is a flow chart diagram illustrating a control method 200 according to an embodiment of the disclosure. The control method 200 can be utilized by the immersive system 100 shown in FIG. 1A, FIG. 1B and FIG. 2. FIG. 4 is a schematic diagram illustrating an embodiment of the immersive content shown on the display panel 146 in FIG. 1B and FIG. 2.

As shown in the embodiment of FIG. 4, the immersive content shown on the display panel 146 includes a right visual window RWd and a left visual window LWd. The immersive content also includes a non-active area NA outside than the right visual window RWd and a left visual window LWd on the display panel 146. The non-active area NA can be displayed with as a black background surrounding the right visual window RWd and a left visual window LWd. The right visual window RWd and the left visual window LWd are displayed synchronously at different positions on the display panel. Because the left lens unit 126L and the right lens unit 126R of the headset device 120, the fields of views of the user will substantially fall within the right visual window RWd and the left visual window LWd. The non-active area NA will be located outside the fields of views of the user (or located on the edges of the fields of views of the user). The non-active area NA may help to separate two visual windows (e.g., the right visual window RWd and the left visual window LWd) and guide eyes of the user to the correct visual windows, so as to reduce the cross-eye experience.

As shown in FIG. 2 and FIG. 3, operation S202 is executed to determine the interpupillary distance value by the pupillary sensor 124. In the embodiment shown in FIG. 4, the current interpupillary distance value IPD1 is determined by the pupillary sensor 124 corresponding to the current user. Operation S204 is executed to transmit the interpupillary distance value IPD1 to the displaying device 140. Operation S206 is executed by the processing circuit 144 to allocate the right visual window RWd and the left visual window LWd of the immersive content according to the interpupillary distance value IPD1.

As shown in FIG. 4, the right visual window RWd and the left visual window LWd are allocated by the processing circuit 144 to have a gap distance GD1 between the center CR1 of the right visual window RWd and the center CL1 of the left visual window LWd. The gap distance GD1 is configured to be positively correlated to the interpupillary distance value IPD1. If the interpupillary distance value IPD1 is longer, the right visual window RWd and the left visual window LWd will be allocated by the processing circuit 144 to have a wider gap distance GD1. If the interpupillary distance value IPD1 is shorter, the right visual window RWd and the left visual window LWd will be allocated by the processing circuit 144 to have a closer gap distance GD1.

In the embodiment shown in FIG. 4, the gap distance GD1 is configured to be equal to the interpupillary distance value IPD1, such that the right visual window RWd and the left visual window LWd will be aligned to eye visions of the users. In this case, the eyes of user can look straight forward without stressing eyes inward or outward.

In addition, as the embodiment shown in FIG. 4, the positions of the left lens unit 126L and the right lens unit 126R are also moved corresponding to the interpupillary distance value IPD1, such that a distance between the centers of the left lens unit 126L and the right lens unit 126R will be equal to the interpupillary distance value IPD1. In an embodiment, the left lens unit 126L and the right lens unit 126R are moved by a mechanical actuator (e.g., a gear set and/or a micro motor).

It is noticed that the locations of the right visual window RWd and the left visual window LWd in the embodiment are not fixed at default positions and will be reallocated dynamically by the processing circuit 144 when the interpupillary distance value varies.

Figure 5:
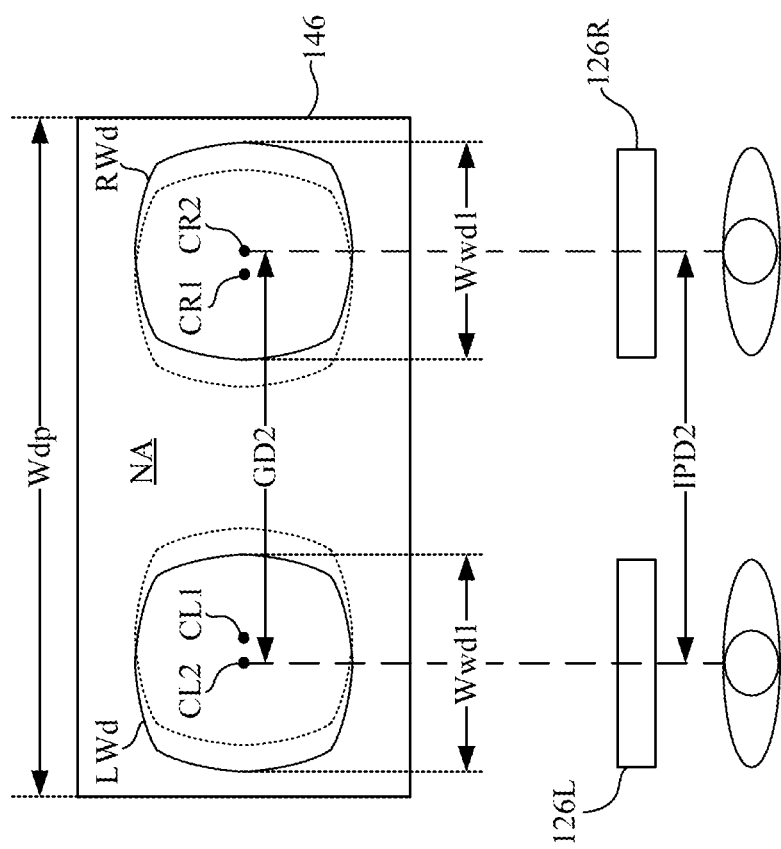
FIG. 5 is a schematic diagram illustrating another embodiment of the immersive content shown on the display panel in FIG. 1B and FIG. 2.

Reference is further to FIG. 2, FIG. 3 and FIG. 5. FIG. 5 is a schematic diagram illustrating another embodiment of the immersive content shown on the display panel 146 in FIG. 1B and FIG. 2. For example, the immerse system 100 is now utilized by another person with a different interpupillary distance value IPD2. In the embodiment, the interpupillary distance value IPD2 in FIG. 5 is wider than the interpupillary distance value IPD1 shown in FIG. 4. The interpupillary distance value IPD2 can be determined by the pupillary sensor 124 in FIG. 2 (e.g., through the adjustment controller 124a or the eye-tracking camera 124b in FIG. 1A) in the operation S202. The interpupillary distance value IPD2 is sent to the displaying device 140 in the operation S204. Then, operation S206 is executed by the processing circuit 144 to allocate the right visual window RWd and the left visual window LWd of the immersive content according to the interpupillary distance value IPD2.

In the embodiment shown in FIG. 5, the right visual window RWd and the left visual window LWd are allocated by the processing circuit 144 to have another gap distance GD2 between the center CR2 of the right visual window RWd and the center CL2 of the left visual window LWd. The gap distance GD2 is configured to be positively correlated to the interpupillary distance value IPD2.

In the embodiment shown in FIG. 5, the gap distance GD2 is configured to be equal to the interpupillary distance value IPD2 determined by the pupillary sensor 124. Compared to the embodiment shown in FIG. 4 corresponding to the interpupillary distance value IPD1, the right visual window RWd and the left visual window LWd in FIG. 5 are moved away from each other. The right visual window RWd and the left visual window LWd in FIG. 5 are allocated to have the gap distance GD2 (equal to the interpupillary distance value IPD2), such that the allocations of the right visual window RWd and the left visual window LWd in FIG. 5 will match the user who has the relative longer interpupillary distance value IPD2. If the right visual window RWd and the left visual window LWd are not reallocated and fixed at the center CL1/CR1, the user is required his/her eyes inward to look into the right visual window RWd and the left visual window LWd. Based on the dynamically allocation of the right visual window RWd and the left visual window LWd, eye visions of the user with a longer interpupillary distance value IPD2 can also be aligned to the locations of the right visual window RWd and the left visual window LWd as shown in FIG. 5.

In addition, as the embodiment shown in FIG. 5, the positions of the left lens unit 126L and the right lens unit 126R are also moved corresponding to the interpupillary distance value IPD2, such that a distance between the centers of the left lens unit 126L and the right lens unit 126R will be equal to the interpupillary distance value IPD2. In an embodiment, the left lens unit 126L and the right lens unit 126R are moved by a mechanical actuator (e.g., a gear set and/or a micro motor).

Operations S202 to S206 of the control method 200 can be repeated every time when the interpupillary distance value varies (e.g., from IPD1 to IPD2) or a new interpupillary distance value is detected. In aforesaid embodiments, the gap distance GD1/GD2 is configured to be positively correlated to the interpupillary distance value IPD1/IPD2. When the interpupillary distance value increases, the right visual window RWd and the left visual window LWd are moved outward away from each other.

However, the display panel 146 has a dimensional limitation. Therefore, the right visual window RWd and the left visual window LWd may not be able to move further outward over a boundary of the display panel 146. In an embodiment, a threshold value is determined by a panel width Wdp of the display panel 146, a first dimensional parameter of the right visual window RWd, and a second dimensional parameter of the left visual window LWd.

As shown in FIG. 4, the display panel has a panel width Wdp. In the embodiment of FIG. 4, the right visual window and the left visual window are squircle windows. The right visual window RWd has with a default window width Wwd1. The left visual window LWd also has with the same default window width Wwd1. The threshold value in the embodiment can be assigned as "Wdp-Wwd1".

In the embodiment of FIG. 4, a sum of the interpupillary distance value IPD1 and the window width Wwd1 is shorter than the panel width Wdp (i.e., IPD1+Wwd1<Wdp, which means that IPD1 is less than the threshold), such the left boundary of the left visual window LWd and the right boundary of the right visual window RWd are located within the display panel 146.

In the embodiment of FIG. 5, a sum of the interpupillary distance value IPD2 and the window width Wwd1 is still shorter than the panel width Wdp (i.e., IPD2+Wwd1<Wdp, which means that IPD2 is less than the threshold), such the left boundary of the left visual window LWd and the right boundary of the right visual window RWd are still located within the display panel 146.

When the interpupillary distance value exceeds the threshold value, the right visual window RWd and the left visual window LWd with default shapes and default sizes shown in FIG. 4 and FIG. 5 will be located outside the boundary of the display panel 146.

Figure 6A:
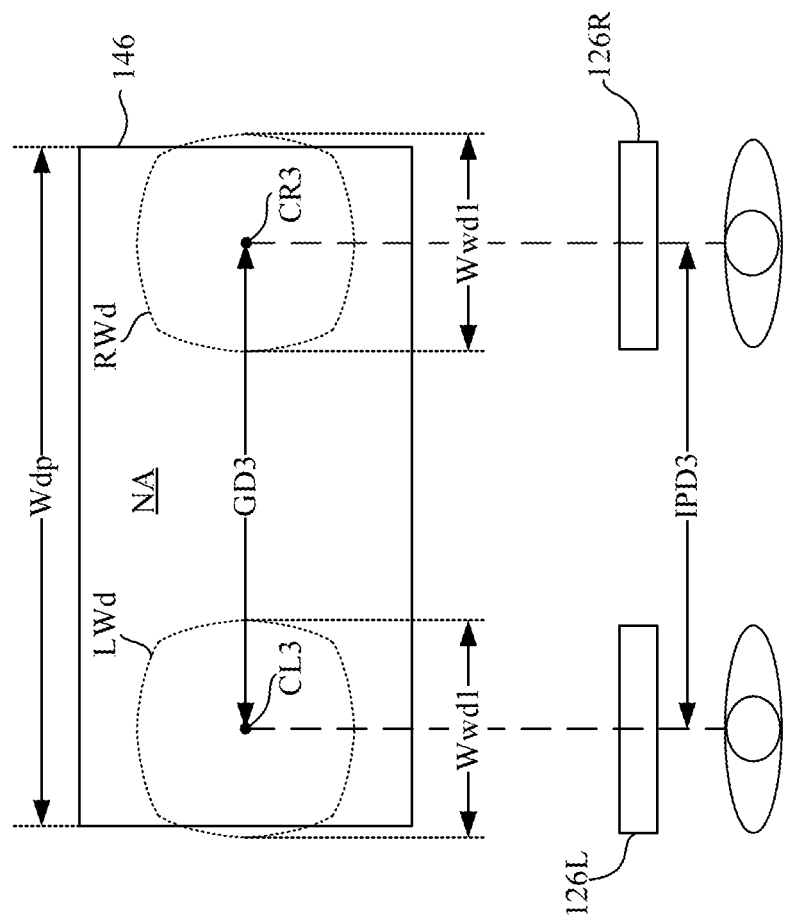
FIG. 6A is a schematic diagram illustrating an example of the immersive content with the left visual window and the right boundary of the right visual window located outside of the display panel.

Reference is further made to FIG. 6A. FIG. 6A is a schematic diagram illustrating an example of the immersive content with a left boundary of the left visual window LWd and a right boundary of the right visual window RWd located outside of the display panel 146. In the embodiments, it is assumed that the interpupillary distance value IPD3 is determined by the pupillary sensor 124. In this embodiment, the interpupillary distance value IPD3 is larger than the interpupillary distance value IPD1/IPD2 in FIG. 4 or FIG. 5. In this embodiment, a sum of the interpupillary distance value IPD3 and the default window width Wwd1 exceeds the panel width Wdp (i.e., IPD3+Wwd1>Wdp, which means that IPD3 exceeds the threshold), such that the right visual window RWd and the left visual window LWd with default shapes and default sizes shown in FIG. 4 and FIG. 5 are no longer suitable to be displayed on the display panel 146, when the interpupillary distance value IPD3 exceeds the threshold value "Wdp-Wwd1".

As shown in FIG. 3, the control method in an embodiment further include operation S208 to determine whether the interpupillary distance value exceeds the threshold value or not. Based on aforesaid embodiments shown in FIG. 4, FIG. 5, and FIG. 6A, the threshold value can be configured to be "Wdp-Wwd1". For embodiments shown in FIG. 4 (IPD1<Wdp-Wwd1) and FIG. 5 (IPD2<Wdp-Wwd1), the right visual window RWd and the left visual window LWd will be allocated according to the interpupillary distance value IPD1/IPD2 respectively and returns to operation S202.

For embodiments shown in FIG. 6A (IPD3>Wdp-Wwd1), operation S210 of the control method 200 is executed to adjust shapes or dimensional parameters of the right visual window RWd and the left visual window LWd according to the interpupillary distance value IPD3.

Figure 6B:
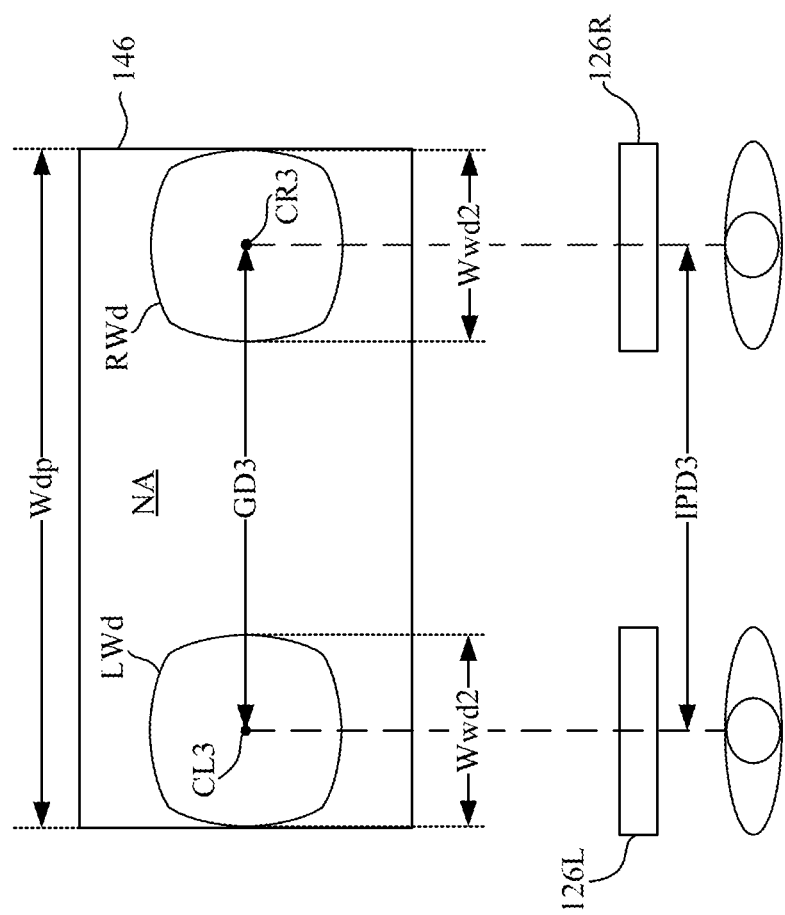
FIG. 6B is a schematic diagram illustrating an embodiment of the adjusted left visual window and the adjusted right visual window.

Reference is further made to FIG. 6B. FIG. 6B is a schematic diagram illustrating an embodiment of the adjusted left visual window LWd and the adjusted right visual window RWd in S210. In the embodiment shown in FIG. 6B, the right visual window RWd and the left visual window LWd are adjusted to have reduced widths. As the embodiment shown in FIG. 6B, a width of the right visual window RWd is reduced from the default window width Wwd1 (referring to FIG. 6A) to a reduced window width Wwd2. Similarly, a width of the right visual window LWd is reduced from the default window width Wwd1 (referring to FIG. 6A) to a reduced window width Wwd2. Because the right visual window RWd and the left visual window LWd are adjusted to have the reduced width, the right visual window RWd and the left visual window LWd can be fitted into the display panel 146 with the gap distance GD3. The gap distance GD3 is located between the center CR3 of the right visual window RWd and the center CL3 of the left visual window LWd by the processing circuit 144.

Figure 6C:
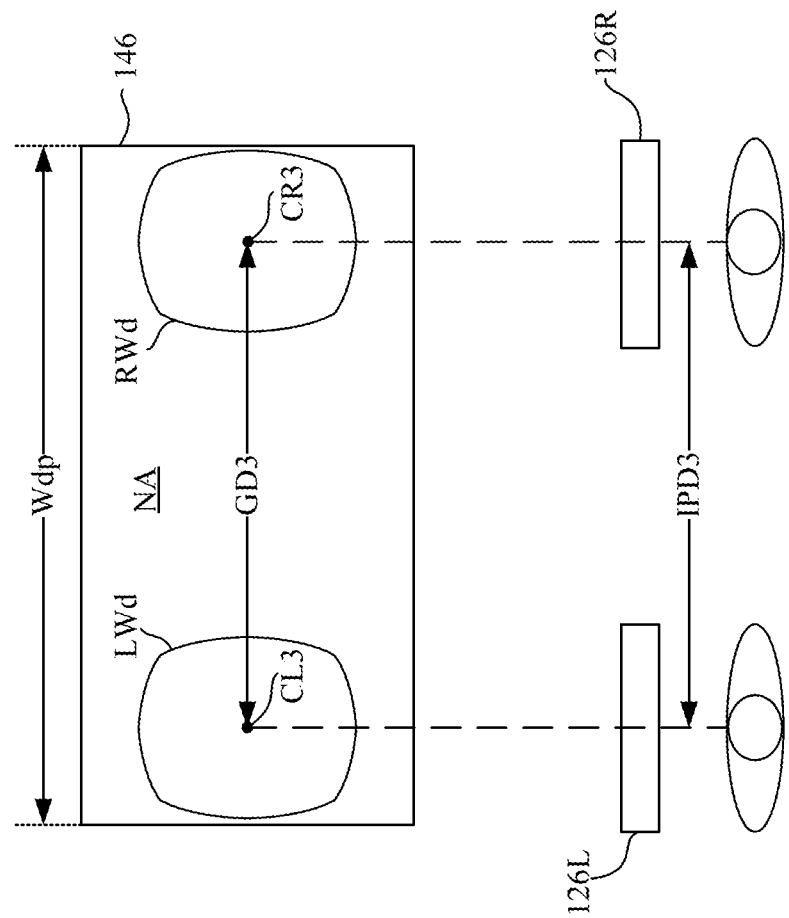
FIG. 6C is a schematic diagram illustrating another embodiment of the adjusted left visual window and the adjusted right visual window.

Reference is further made to FIG. 6C. FIG. 6C is a schematic diagram illustrating another embodiment of the adjusted left visual window LWd and the adjusted right visual window RWd in S210. In the embodiment shown in FIG. 6C, the right visual window RWd and the left visual window LWd are reshaped into round rectangular windows. In the embodiment shown in FIG. 6C, the round rectangular windows have the same height as the original visual windows and reduced widths relative to the original visual windows. As the embodiment shown in FIG. 6C, the reshaped right visual window RWd and the reshaped left visual window LWd are adjusted to be able to fit into the display panel 146 with the gap distance GD3. The gap distance GD3 is located between the center CR3 of the reshaped right visual window RWd and the center CL3 of the reshaped left visual window LWd.

Based on aforesaid embodiments shown in FIG. 6B and FIG. 6C, the gap distance GD3 between the adjusted visual windows are dynamically decided by the interpupillary distance value IPD3. The processing circuit 144 further processes to adjust the right visual window RWd and the left visual window LWd (by adjusting shapes or dimensional parameters) to fit the adjusted windows into the boundary of display panel 146. Therefore, the right visual window RWd and the left visual window LWd can be aligned to the user's visions and also fully displayed on the display panel 146.

Furthermore, as the embodiment shown in FIG. 6B and FIG. 6C, the positions of the left lens unit 126L and the right lens unit 126R are also moved corresponding to the interpupillary distance value IPD3, such that a distance between the centers of the left lens unit 126L and the right lens unit 126R will be equal to the interpupillary distance value IPD3. In an embodiment, the left lens unit 126L and the right lens unit 126R are moved by a mechanical actuator (e.g., a gear set and/or a micro motor).

Figure 7:
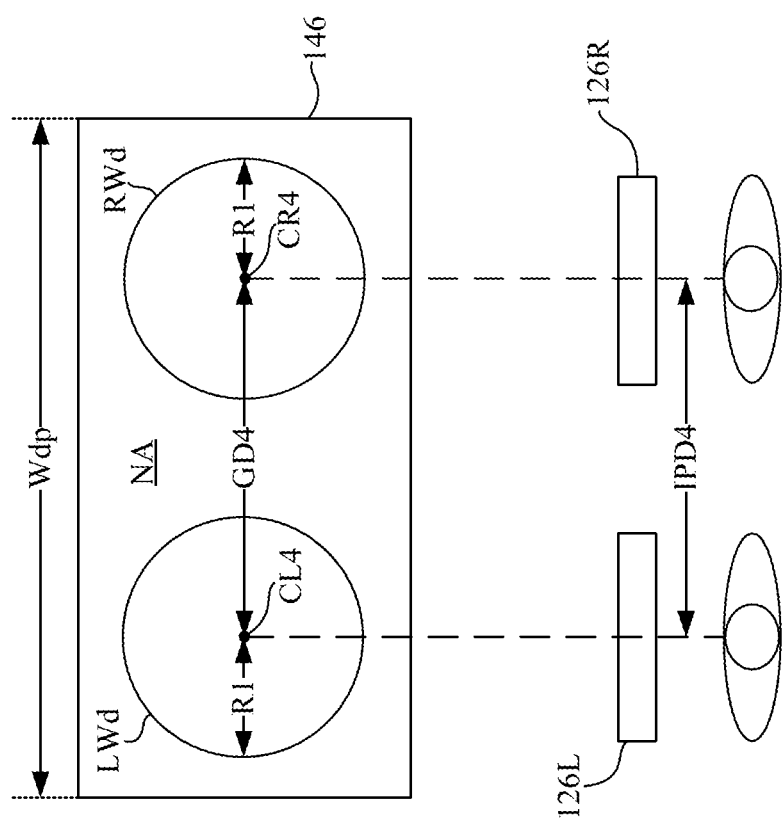
FIG. 7 is a schematic diagram illustrating another embodiment of the left visual window and the right visual window displayed on the display panel.

In aforesaid embodiments, the right visual window RWd and the left visual window LWd are squircle windows for demonstration. However, the disclosure is not limited thereto. In some other embodiments, the right visual window RWd and the left visual window LWd can be shaped in other suitable shapes. Reference is further made to FIG. 7. FIG. 7 is a schematic diagram illustrating another embodiment of the left visual window LWd and the right visual window RWd displayed on the display panel 146.

As the embodiment shown in FIG. 7, the right visual window RWd and the left visual window LWd are circular windows. The right visual window RWd and the left visual window LWd are allocated by the processing circuit 144 to have a gap distance GD4 between the center CR4 of the right visual window RWd and the center CL4 of the left visual window LWd. The right visual window RWd is a circular window has a default radius R1 originated from the center CR4. The left visual window LWd is another circular window has the same default radius R1 originated from the center CL4. The threshold value is determined by the panel width Wdp of the display panel 146 and the default radius R1 of the right visual window RWd and the default radius R1 of the left visual window LWd. In this embodiment, the threshold value is configured to be "Wdp−2*R1".

In the embodiment shown in FIG. 7, the interpupillary distance value IPD4 is lower than the threshold value "Wdp−2*R1". The center CR4 of the right visual window RWd and the left center CL4 of the left visual window LWd are arranged to have a gap distance GD4, which is positively correlated to the interpupillary distance value IPD4. Similarly to aforesaid embodiments, the gap distance GD4 is configured to be equal to the interpupillary distance value IPD4 by the processing circuit 144 in operation S202-S206.

Furthermore, as the embodiment shown in FIG. 7, the positions of the left lens unit 126L and the right lens unit 126R are also moved corresponding to the interpupillary distance value IPD4, such that a distance between the centers of the left lens unit 126L and the right lens unit 126R will be equal to the interpupillary distance value IPD4.

Reference is further made to FIG. 8A. FIG. 8A is a schematic diagram illustrating an embodiment of the adjusted left visual window LWd and the adjusted right visual window RWd in S210 relative to the embodiment shown in FIG. 7. If another interpupillary distance value IPD5 is determined to be over the threshold value "Wdp−2*R1" in operation S208, the left visual window LWd and the right visual window RWd will be adjusted in operation S210.

In the embodiment shown in FIG. 8A, the right visual window RWd is adjusted to have the reduced radius R2, which is shorter than the default radius R1 (referring to FIG. 7). Similarly, the left visual window LWd is adjusted to have the reduced radius R2, which is shorter than the default radius R1 (referring to FIG. 7). Because the right visual window RWd and the left visual window LWd are adjusted to have the reduced radius R2, the right visual window RWd and the left visual window LWd can be fitted into the display panel 146 with the gap distance GD5. The gap distance GD5 is located between the center CR5 of the right visual window RWd and the center CL5 of the left visual window LWd.

Figure 8B:
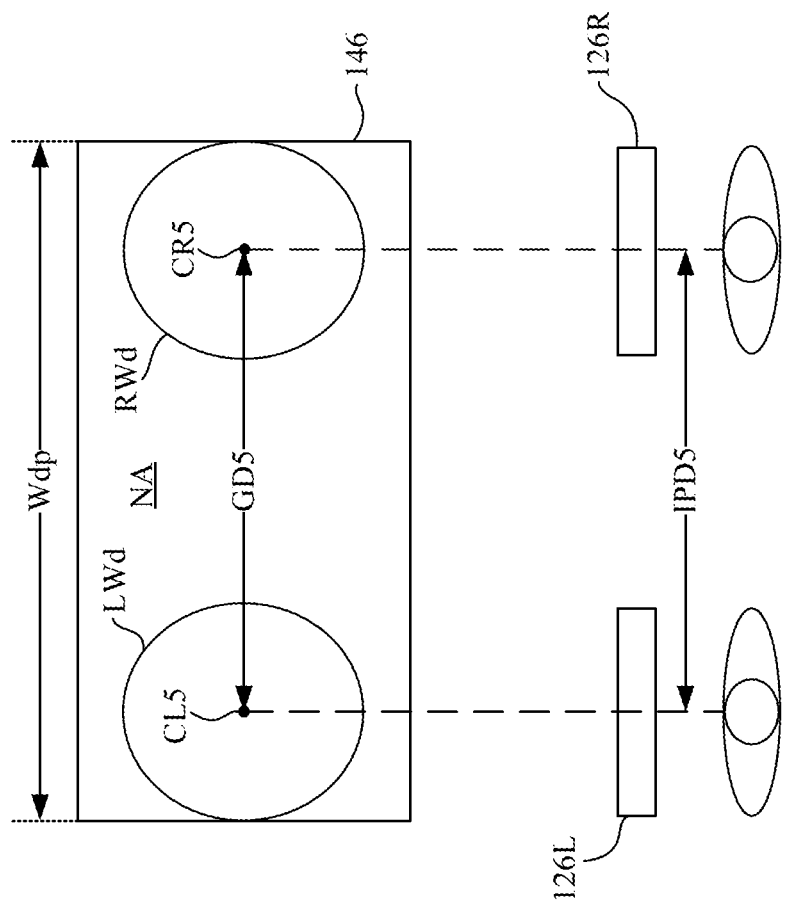
FIG. 8B is a schematic diagram illustrating another embodiment of the adjusted left visual window and the right boundary of the adjusted right visual window.

Reference is further made to FIG. 8B. FIG. 8B is a schematic diagram illustrating another embodiment of the adjusted left visual window LWd and the right boundary of the adjusted right visual window RWd in S210. In the embodiment shown in FIG. 8B, the right visual window RWd and the left visual window LWd are reshaped from circular windows (referring to FIG. 7) into oval windows. In the embodiment shown in FIG. 8B, the oval windows have the same height as the original visual windows and reduced widths relative to the original visual windows. As the embodiment shown in FIG. 8B, the reshaped right visual window RWd and the reshaped left visual window LWd are adjusted to be able to fit into the display panel 146 with the gap distance GD5. The gap distance GD5 is located between the center CR5 of the reshaped right visual window RWd and the center CL5 of the reshaped left visual window LWd by the processing circuit 144.

Furthermore, as the embodiment shown in FIG. 8A and FIG. 8B, the positions of the left lens unit 126L and the right lens unit 126R are also moved corresponding to the interpupillary distance value IPD5, such that a distance between the centers of the left lens unit 126L and the right lens unit 126R will be equal to the interpupillary distance value IPD5.

Based on aforesaid embodiments, the locations of the visual windows can be dynamically allocated with different gap distances according to the interpupillary distance values, such that the user can observe the immersive content without stressing his/her eyes, and so to provide an optimal viewing experience. In addition, when the interpupillary distance is relatively larger (over a specific threshold value), shapes or dimensional parameters of the visual windows are adjusted to avoid the visual windows from extending out of the boundary of the display panel.

Figure 9:
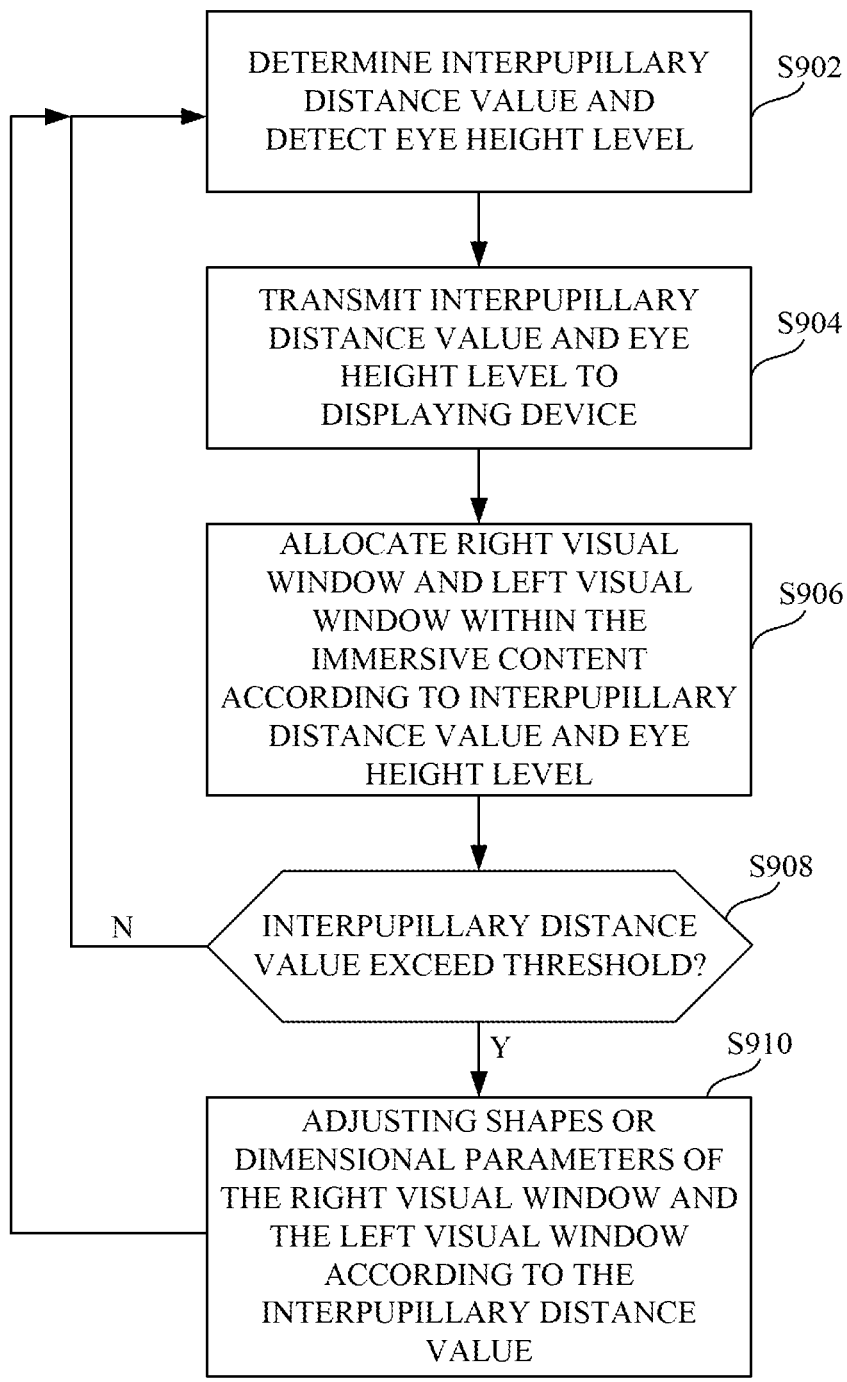
FIG. 9 is a flow chart diagram illustrating a control method according to an embodiment of the disclosure.

In some embodiments, the locations of the visual windows can be dynamically moved along a horizontal direction with different gap distances according to the interpupillary distance values. However, the disclosure is not limited thereto. Reference is further made to FIG. 9, which is a flow chart diagram illustrating a control method 900 according to an embodiment of the disclosure. The control method 900 can be utilized by the immersive system 100 in FIG. 1A, FIG. 1B and FIG. 2.

As shown in FIG. 9, operation S902 is executed to determine the interpupillary distance value and detect an eye height level by the pupillary sensor 124. For example, the pupillary sensor 124 includes an eye-tracking camera 124b (referring to FIG. 1A) disposed on the headset device 120. The eye-tracking camera 124b is configured to measure the interpupillary distance value IPDv and detect the eye height level. For example, the eye-tracking camera 124b can capture images of the eyes. The eye height level of the pupils are detected by the eye-tracking camera 124b, and the interpupillary distance value IPD6 is measured accordingly by the eye-tracking camera 124b in the embodiment shown in FIG. 10.

Figure 10:
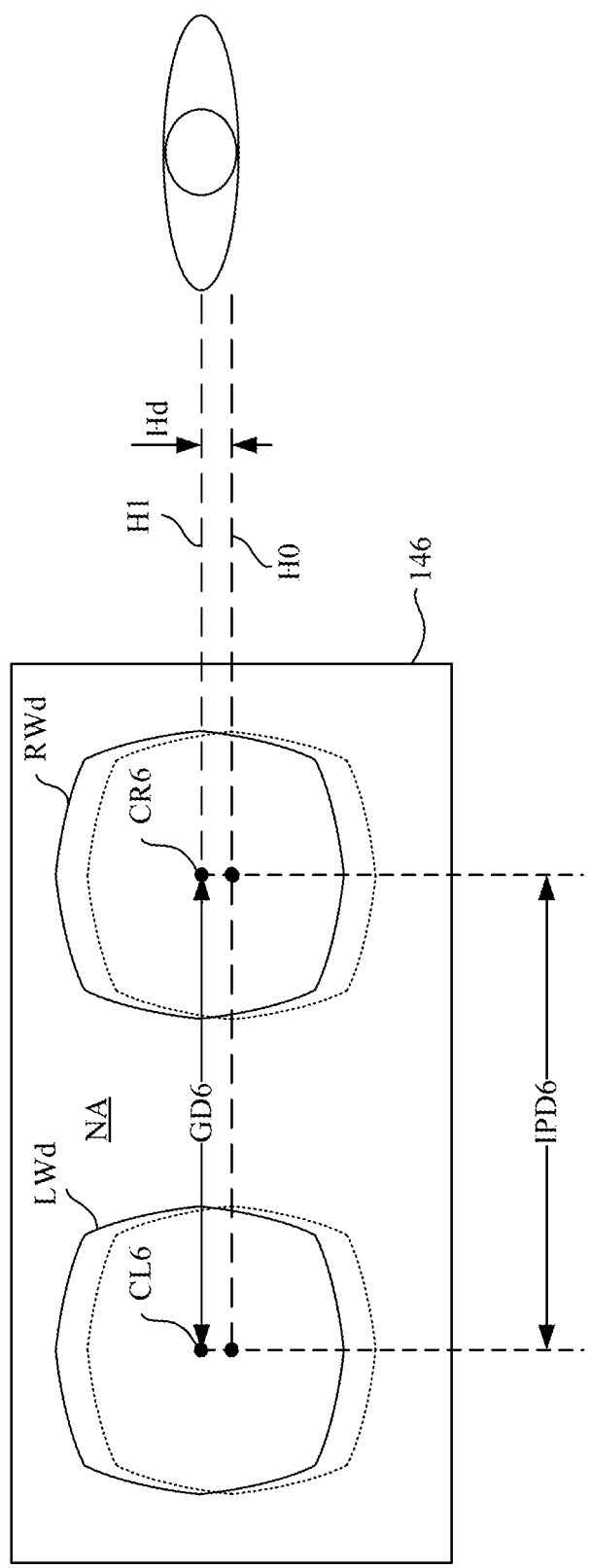
FIG. 10 is a schematic diagram illustrating an embodiment of the immersive content shown on the display panel related to the control method shown in FIG. 9.

FIG. 10 is a schematic diagram illustrating an embodiment of the immersive content shown on the display panel 146 related to the control method 900 shown in FIG. 9. As shown in FIG. 10, the eyes are detected by the eye-tracking camera 124b at the eye height level H1. The eye height level H1 is located above a reference eye height level H0 by a height level difference Hd.

As shown in FIG. 9 and FIG. 10, operation S904 is executed to transmit the interpupillary distance value IPD6 and the eye height level H1 to the displaying device 140. Operation S906 is executed to allocate a right visual window RWd and a left visual window LWd of the immersive content according to the interpupillary distance value IPD6 and also the eye height level H1. In this embodiment, a gap distance GD6 between a center CR6 of the right visual window RWd and a center CL6 of the left visual window LWd are decided by the processing circuit 144 according to the interpupillary distance value IPD6. Details about how to allocate the right visual window RWd and the left visual window LWd according to the to the interpupillary distance value IPD6 has been discussed in embodiments shown in FIG. 4 to FIG. 8B and not to be repeated herein.

It is noticed that a height level of the center CR6 of the right visual window RWd and the center CL6 of the left visual window LWd are adjusted according to the eye height level H1. If the user wears the headset device 120 in different ways, the eye height level H1 of the user may not be located in the middle relative to the headset device 120. In the embodiment shown in FIG. 10, when the eye height level H1 is shifted upward from the reference eye height level H0, the center CR6 of the right visual window RWd and the center CL6 of the left visual window LWd are moved toward the top side according to the eye height level Hi. In the embodiment, the center CR6 and the center CL6 are shifted upward to the top side by the level difference Hd relative to a reference height level HO (i.e., the middle level of the display panel 146).

On the other hand, the eye height level is detected to be lower than the reference eye height level H0, the processing circuit 144 can allocate the height level of the center CR6 of the right visual window RWd and the center CL6 of the left visual window LWd at lower locations relative to the reference height level H0.

Other behaviors of operations S902 to S910 of the control method 900 are similar to operations S202 to S210 of the control method 200 in aforesaid embodiments. Details about how to allocate the right visual window RWd and the left visual window LWd according to the to the interpupillary distance value IPD6 are explained in aforesaid embodiments of the control method 200 in FIG. 3 and not to be repeated herein.

Based on embodiments of control method 900 the right visual window RWd and the left visual window LWd of the immersive content can be allocated according to the interpupillary distance value and also the eye height level. Therefore, the right visual window RWd and the left visual window LWd can be aligned to projection points of user visions in both of the horizontal direction (according to the interpupillary distance value) and the vertical direction (according to the eye height level). Therefore, the immersive system can provide a better viewing experience to the user.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An immersive headset system, comprising:
a headset device, comprising a pupillary sensor for determining an interpupillary distance value; and
a displaying device, communicated with the headset device, the displaying device comprising:
a display panel for displaying an immersive content comprising a right visual window, a left visual window and a non-active area, the right visual window and the left visual window being displayed synchronously at different positions on the display panel, the non-active area surrounding and separating the right visual window and the left visual window, in response to the displaying device receives the interpupillary distance value from the headset device, an entire of the right visual window and an entire of the left visual window of the immersive content being allocated according to the interpupillary distance value,
wherein shapes or dimensional parameters of the right visual window and the left visual window are adjusted in response to that the interpupillary distance value exceeds a threshold value, and the threshold value is determined by a panel width of the display panel, a first dimensional parameter of the right visual window, and a second dimensional parameter of the left visual window.

2. The immersive headset system of claim 1, wherein the displaying device further comprises a communication circuit, the communication circuit is configured to receive the interpupillary distance value from the headset device.

3. The immersive headset system of claim 2, wherein the displaying device further comprises a processing circuit, the processing circuit is coupled with the communication circuit, the processing circuit is configured to process the immersive content to be displayed on the display panel.

4. The immersive headset system of claim 1, wherein the right visual window and the left visual window are allocated to have a gap distance between a first center of the right visual window and a second center of the left visual window, the gap distance is configured to be positively correlated to the interpupillary distance value.

5. The immersive headset system of claim 4, wherein the gap distance is configured to be equal to the interpupillary distance value determined by the pupillary sensor.

6. The immersive headset system of claim 1, wherein the right visual window and the left visual window are reshaped from circular windows or squircle windows into oval windows or round rectangular windows in response to that the interpupillary distance value exceeds the threshold value.

7. The immersive headset system of claim 1, wherein a radius or a width of the right visual window and the left visual window is reduced in response to that the interpupillary distance value exceeds the threshold value.

8. The immersive headset system of claim 1, wherein the headset device further comprises:
   a housing for accommodating the displaying device; and
   a communication circuit coupled with the pupillary sensor, the communication circuit is configured to transmit the interpupillary distance value to the displaying device.

9. The immersive headset system of claim 1, wherein the pupillary sensor comprises an eye-tracking camera disposed on the headset device, the eye-tracking camera is configured to measure the interpupillary distance value.

10. The immersive headset system of claim 1, wherein the pupillary sensor comprises an adjustment controller disposed on the headset device, the interpupillary distance value is adjusted corresponding to a manipulation input on the adjustment controller.

11. The immersive headset system of claim 1, wherein the pupillary sensor is further configured to detect an eye height level, the eye height level is transmitted to the displaying device, the right visual window and the left visual window is allocated further according to the eye height level.

12. A control method, suitable for an immersive headset system, the immersive headset system comprises a displaying device for displaying an immersive content, the control method comprising:
   determining an interpupillary distance value;
   transmitting the interpupillary distance value to the displaying device, wherein the immersive content displayed on the displaying device comprising a right visual window, a left visual window and a non-active area, the non-active area surrounding and separating the right visual window and the left visual window; and
   allocating an entire of the right visual window and an entire of the left visual window of the immersive content according to the interpupillary distance value;
   adjusting shapes or dimensional parameters of the right visual window and the left visual window in the response to that the interpupillary distance value exceeds a threshold value, and the threshold value is determined by a panel width of the display panel, a first dimensional parameter of the right visual window, and a second dimensional parameter of the left visual window.

13. The control method of claim 12, wherein the right visual window and the left visual window are allocated to have a gap distance between a first center of the right visual window and a second center of the left visual window, the gap distance is configured to be positively correlated to the interpupillary distance value.

14. The control method of claim 13, wherein the gap distance is configured to be equal to the interpupillary distance value determined by the pupillary sensor.

15. The control method of claim 12, wherein the right visual window and the left visual window are reshaped from circular windows or squircle windows into oval windows or round rectangular windows in response to that the interpupillary distance value exceeds the threshold value.

16. The control method of claim 12, wherein a radius or a width of the right visual window and the left visual window is reduced in response to that the interpupillary distance value exceeds the threshold value.

17. The control method of claim 12, further comprising:
   detecting an eye height level;
   transmitting the eye height level to the displaying device; and
   allocating the right visual window and the left visual window of the immersive content further according to the eye height level.

* * * * *